(12) United States Patent
Kaandorp et al.

(10) Patent No.: US 6,419,309 B1
(45) Date of Patent: Jul. 16, 2002

(54) OPEN ROOF CONSTRUCTION FOR A VEHICLE

(75) Inventors: Wouter Petrus Kaandorp, Roermond; Marcel Johan Christiaan Nellen, Venray, both of (NL)

(73) Assignee: Inalfa Industries B.V. (NL)

( * ) Notice: Subject to any disclaimer, the term of this patent is extended or adjusted under 35 U.S.C. 154(b) by 0 days.

(21) Appl. No.: 09/566,475

(22) Filed: May 8, 2000

(30) Foreign Application Priority Data

May 12, 1999 (NL) ............................................ 1012052

(51) Int. Cl.⁷ ................................................ B60J 7/047
(52) U.S. Cl. .................................. 296/216.03; 296/223
(58) Field of Search ....................... 296/216.02–216.05, 296/220.01, 223

(56) References Cited

U.S. PATENT DOCUMENTS

| | | | |
|---|---|---|---|
| 4,699,421 A | * 10/1987 | Schaetzler et al. | 296/221 |
| 5,069,501 A | 12/1991 | Baldwin et al. | 296/223 |
| 5,531,501 A | * 7/1996 | Nabuurs | 296/223 X |
| 5,618,081 A | * 4/1997 | Nabuurs | 296/216.03 |

FOREIGN PATENT DOCUMENTS

| | | |
|---|---|---|
| DE | 196 35 145 C | 2/1997 |
| EP | 0 657 316 A | 6/1995 |

\* cited by examiner

*Primary Examiner*—Dennis H. Pedder
(74) *Attorney, Agent, or Firm*—Westman, Champlin & Kelly, P.A.; S. Koehler

(57) ABSTRACT

An open roof construction for a vehicle having an opening in its fixed roof comprises a frame to be fixed to the roof. The frame includes guide rails extending on either side of the roof opening. At least one adjustable closure element is adjustable between a closed position, in which it closes the roof opening, and an open position, in which it has been moved rearwards to a position above the fixed roof. An operating mechanism disposed between the closure element and the guide rails comprises a supporting member which supports said closure element, a guideway extending at least in a longitudinal direction of the guide rail, and a slide which is capable of sliding movement along said guide rails. The slide includes first and second guide members which are in engagement with the guideway for the purpose of moving the closure element upon movement of the slide. The first and second guide members are formed on the slide in spaced-apart relationship in the longitudinal direction of the guide rails. The guide members are successively in and out of engagement with and the guideway, respectively.

18 Claims, 1 Drawing Sheet

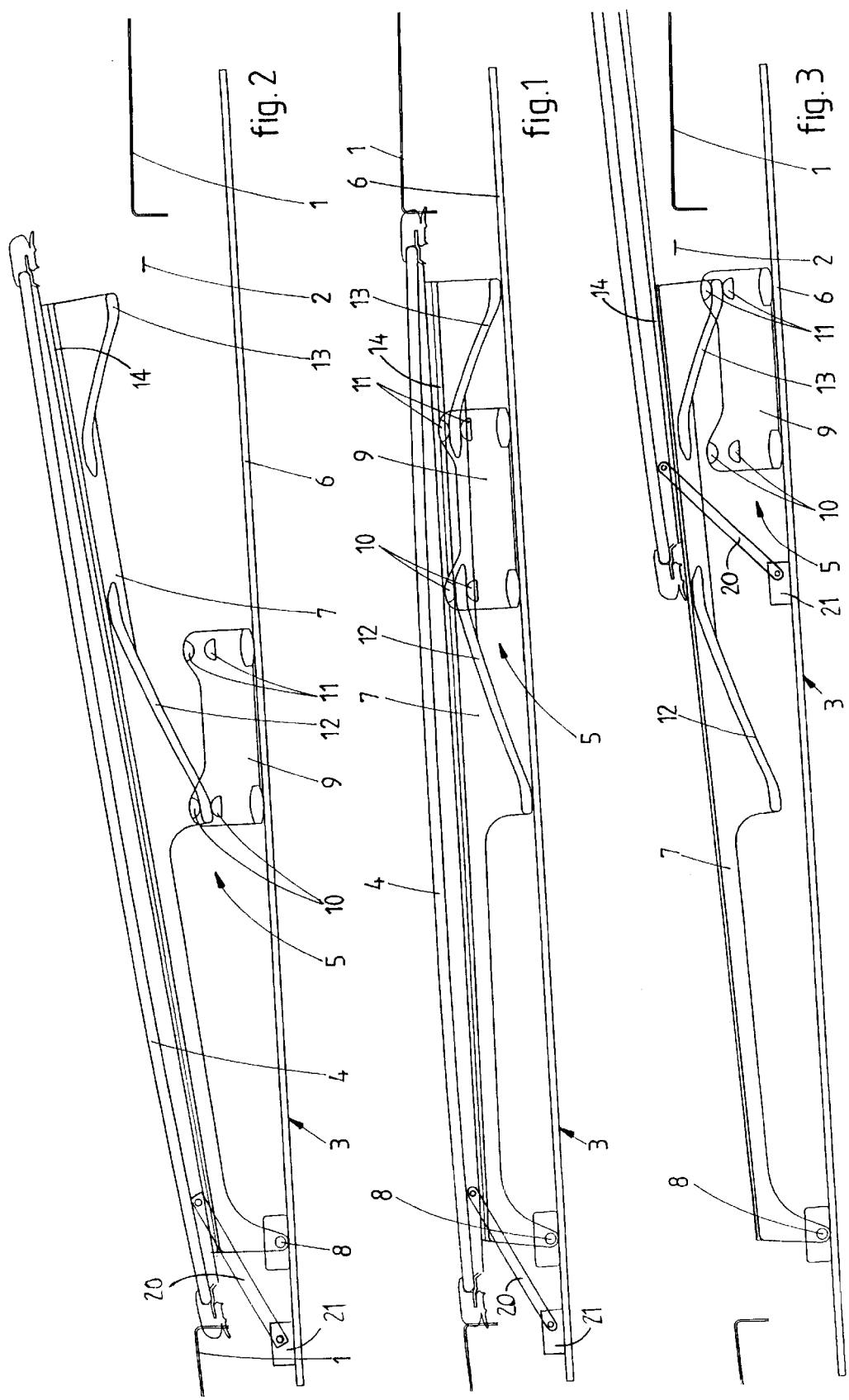

OPEN ROOF CONSTRUCTION FOR A VEHICLE

BACKGROUND OF THE INVENTION

The invention relates to an open roof construction in a vehicle having an opening in a fixed roof. Such open roof constructions are known in a variety of versions thereof. Commonly, a guideway is provided under the panel, which may, for example, comprise a guide slot. The guide slot may or may not be curved. One or two pins of a slide engage the slot and with or without a lever effect the desired movement of the panel upon movement of the slide, for example by means of a driving cable. For instance, U.S. Pat. No. 5,069,501 discloses a spoiler sunroof control mechanism comprising a supporting member having two pairs of guide pins. The control mechanism further comprises a stationary slide and a driving slide each having two guide slots. The guide pins are constantly in engagement with their respective guide slots.

SUMMARY OF THE INVENTION

The object of the present invention is to further improve the open roof construction of the kind referred to in the introduction.

By using two spaced-apart guide members which are successively in and out of engagement with the guideway, it is possible to have the maximum travel of the slide and the spacing between the two ends of the guideway differ from each other, thus providing a greater freedom in the selection of the length of the guideway in longitudinal direction and of the maximum travel of the slide. This makes it possible to gear the respective movements better to each other.

As discussed above, U.S. Pat. No. 5,069,501 discloses a spoiler sunroof control mechanism comprising a supporting member having two pairs of guide pins. The control mechanism further comprises a stationary slide and a driving slide each having two guide slots. The guide pins are constantly in engagement with their respective guide slots. The guide pins are not successively in and out of engagement with the guide slots.

In order to effect an easy transfer of the engagement of the guide members with the guideway, the guideway is preferably divided into two portions, so that a first guideway portion can come into engagement with the first guide member and the second guideway portion can come into engagement with the second guide member.

The invention is particularly suitable for an open roof construction in which the slide can be moved both forwards and rearwards from a position corresponding to the closed position of the panel so as to pivot the panel upwards, whilst the panel can also be moved rearwards in one of said two directions. The guideway is preferably formed so that when the slide is being moved so as to move the panel rearwards, said panel is pivoted less in an upward direction than when the slide is moved in the opposite direction.

It is advantageous thereby if the first guideway portion and the first guide member are positioned before the second guide way portion and the second guide member, respectively, seen in the longitudinal direction of the open roof construction from the front of the vehicle.

This embodiment has the advantage that the front guide member is in engagement with the front guideway portion in the front position of the slide, as a result of which a relatively large pivoting angle can be achieved without a large slope of said guideway portion being required, so that the overall height can remain small. On the other hand a very stable support of the panel is obtained in the rear position of the slide, wherein the rear guide member is in engagement with the rear guideway portion, without having to move the slide as correspondingly far to the rear for that purpose.

BRIEF DESCRIPTION OF THE DRAWING

The invention will now be explained in more detail with reference to the drawing, which very schematically shows an exemplary embodiment of the open roof construction according to the invention.

FIGS. 1–3 are longitudinal sectional views of the embodiment of the open roof construction according to the invention, showing three different positions thereof.

DETAILED DESCRIPTION OF THE ILLUSTRATIVE EMBODIMENT

The drawing shows only those parts of the open roof construction, which are necessary for a good understanding of the present invention. A more detailed description of some aspects of the open roof construction of this kind is given in the prior international patent application No. PCT/NL00/00070, the content of which is incorporated herein by reference in its entirety.

The drawing shows the fixed roof 1 of a motor vehicle, such as a passenger car, wherein an opening 2 is formed in the fixed roof 1 for accommodating the open roof construction. Said open roof construction comprises a frame 3 or similar stationary part to be fixed to the vehicle, which functions to movably support a closure element 4.

In the illustrated embodiment, the open roof construction is a so-called spoiler roof, which is provided (in this case) with a more or less rigid and preferably transparent panel 4 as the closure element, which is capable of selectively closing roof opening 2 or releasing it to a smaller or larger extent. Panel 4 is to this end laterally supported by operating mechanisms 5 on each side of panel 4. Operating mechanisms 5 are slidably accommodated in guide rails 6, which are mounted on frame 3, for example, or form part thereof and which extend in parallel relationship in longitudinal direction on either side of roof opening 2 and slightly forwards and rearwards thereof. Said operating mechanisms 5 can be moved synchronously in guide rails 6, thus moving panel 4 not only in longitudinal direction, but also in vertical direction. The operating mechanisms 5 are to this end operated from a driving apparatus (not shown) but well known in the art, such as an electric motor or a crank, connected to operating mechanisms 5 for example via driving cables (not shown).

The drawing shows the operating mechanism 5 on one of the long sides of panel 4, and as can be seen in the figure, panel 4 is supported by a supporting member 7, which is pivotally supported at its front end, in this case by a pivot pin 8 which is more or less fixedly connected to guide rail 6.

In the illustrated embodiment, panel 4 is movably supported on supporting member 7 by a linear guide mechanism 14, which allows panel 4 to move relative to support member 7. The linear guide mechanism 14 can take any number of known designs that provide telescoping movement of panel 4 relative to support member 7. The linear guide mechanism 14 can comprise rollers, wheels, slides and/or rails secured as desired to panel 4 and support member 7. Typically, a linear guide mechanism 14 is provided on each side of panel 4.

Operating mechanism 5 comprises a slide 9 which is connected to the aforesaid driving cable and which is slidable in each guide rail 6. Slide 9 functions to operate panel 4 and effect at least some of the movements thereof. Said slide 9 is in engagement with the supporting member 7, and in this embodiment, slide 9 is to that end provided with a first, front guide member 10 and a second, rear guide member 11. Supporting member 7 is in the form of a curve plate, and to that end supporting member 7 comprises a longitudinally extending, vertically curved guideway which, is divided into a first, front guideway portion 12 and a second, rear guideway portion 13. Guide members 10 and 11 and guideway portions 12 and 13 may be configured in various co-operating ways as appreciated by those skilled in the art, for example as pins and slots. However, by way of example in the illustrated embodiment, the guideway portions 12, 13 are ribs projecting to both sides of supporting member 7, whilst guide members 10, 11 each include two sets of cams disposed one above the other, which are capable of engaging the upper side and the lower side, respectively, of the ribs of guideway portions 12 and 13.

The spacing between guide members 10 and 11 is larger than the spacing between the ends of guideway portions 12 and 13, so that the guide members 10 and 11 can be simultaneously in engagement with their associated guideway portions 12 and 13, so that an overlap is present between the respective engagement ranges. As can be seen in the drawing, the slope of the two guideway portions 12 and 13 is at least substantially the same, whilst the length of the first guideway portions 12, parallel to panel 4, is greater than that of the second guideway portion 13.

The operation of the illustrated embodiment of the open roof construction according to the invention is as follows.

FIG. 1 shows panel 4 in its closed position, in which the panel 4 is positioned entirely within roof opening 2 and closes said opening 2 by means of seals. First guide member 10 of slide 9 is positioned in a horizontal (e.g. parallel to panel 4) part of first guideway portion 12, whilst the second guide member 11 is positioned in a front horizontal part of second guideway portion 13, so that panel 4 is firmly retained in its closed position.

In FIG. 2 slide 9 has been moved to its front position, and the panel 4 has thereby been moved about pivot pin 8 to an upwardly pivoted ventilating position. This movement has been effected by the movement of the first, front guide member 10 with respect to the first guideway portion 12. Said movement has been effected both by the slope of the first guideway portion 12 and by the movement of the first guide member 10 of slide 9 in the direction of the pivot pin 8 of panel 4 (at a higher level than pivot pin 8). Since the front guide member 10 of slide 9 is in engagement, the slope of the first guideway portion 12 need not be very large in order to achieve a large pivoting angle or motion of panel 4, which can reduce the overall height of the open roof construction.

Guide member 11 has moved out of engagement with the front part of the second guideway portion 13 during the forward movement of slide 9, so that only the first guide member 10 remains in engagement.

Upon return movement of slide 9 rearwardly, the second guide member 11 will align with and come into engagement with the second guideway portion 13 again near the closed position of panel 4, and the position which is shown in FIG. 1 will be reached again. The tapered end of second guideway portion 13 and/or the enlarged opening of guide member 11 facilitate said re-engagement.

When slide 9 is moved from the closed position according to FIG. 1 to the position according to FIG. 3, on the other hand, it is only the second guide member 11 which is in engagement with the second guideway portion 13. During this movement of slide 9 the first guide member 10 moves out of engagement with the first guideway portion 12. In this position as illustrated in FIG. 3, the second guide member 11 is positioned a large distance away from the pivot pin 8. In this rearmost position, the pivoting angle of panel 4 relative to guide rail 6 is smaller than the position illustrated in FIG. 2. In this less inclined or relatively flat position of panel 4, panel 4 an be moved rearwards with respect to supporting member 7 in a manner such as disclosed in the aforesaid prior international patent application No. PCT/NL00/00070. Briefly, a rod 20 pivotally coupled to panel 4 and a second slide 21 drives panel 4 relative to support member 7 when slide 21 is moved relative to frame 3. Slide 21 can be coupled to a drive mechanism (crank or motor) with drive cables as well known in the art. Slide 21 can slide in guide rail 6 or another guide rail parallel to guide rail 6. If desired, a rod 20 and slide 21 can be provided on each side of panel 4.

From the foregoing it will be apparent that the invention provides an open roof construction which makes it possible to gear the movements of the slide and the panel very well to each other without this being at the expense of the overall height.

The invention is not restricted to the above-described embodiment as shown in the drawing, which can be varied in several ways without departing from the scope of the invention. Thus the invention can also be used very well with a sliding-tilt roof. Furthermore, it is possible that the guideway is formed on the slide and the guide members are formed on the supporting member of the closure element.

What is claimed is:

1. An open roof construction for a vehicle having an opening in a fixed roof, comprising:

a stationary part to be fixed to the roof, said stationary part including at least one guide rail extending on one side of the roof opening, at least one adjustable closure element supported by said stationary part, which is adjustable between a closed position, in which it closes the roof opening, and an open position, in which it has been moved rearwards to a position above the fixed roof, and an operating mechanism disposed between the closure element and the guide rail, and including a supporting member, which supports said closure element, and a slide which is capable of sliding movement along said guide rail, wherein said slide and said supporting member each include one of a guideway, extending at least in a longitudinal direction of the guide rail, and co-operating guide members, said guideway and said guide members being in engagement for the purpose of moving the closure element upon movement of the slide, and wherein the guide members includes a first guide member and a second guide member, which are formed in spaced-apart relationship in the longitudinal direction of the guide rail, said guide members being alternately in engagement with the guideway, and out of engagement with the guideway, respectively, such that for a first portion of movement of the closure element the first guide member is in engagement with the guideway while the second guide member is not in engagement with the guideway, and for a second portion of movement of the closure element the second guide member is in engagement with the guideway while the first guide member is not in engagement with the guideway.

2. The open roof construction according to claim 1, wherein the guideway is divided into two portions, wherein a first guideway portion can come into engagement with the first guide member and the second guideway portion can come into engagement with the second guide member.

3. The open roof construction according to claim 2, wherein the slide can be moved both forwards and rearwards from a position corresponding to the closed position of the closure element so as to pivot the closure element upwards, and wherein the first guideway portion is formed so that when the first guide member is moved relative to the first guideway portion, said closure element can be pivoted in an upward direction to a greater height than when the second guide member is moved relative to the second guideway portion.

4. The open roof construction according to claim 3, wherein the first guideway portion and the first guide member are positioned before the second guideway portion and the second guide member, respectively, seen in the longitudinal direction of the open roof construction.

5. The open roof construction according to claim 4, wherein both guide members are in engagement with their associated guideway portion in the position of the slide which corresponds to the closed position of the closure element.

6. The open roof construction according to claim 2, wherein the two guideway portions extend at least substantially parallel to each other over a small distance at their facing ends and subsequently downwards at opposite ends.

7. The open roof construction according to claim 1, and further comprising a linear guide mechanism between the closure element and the supporting member.

8. The open roof construction according to claim 1, wherein the guideway is formed on the supporting member and wherein the guide members are formed on the slide.

9. An open roof construction for a vehicle having an opening in a fixed roof, comprising:
 a stationary part to be fixed to the roof, said stationary part including at least one guide rail extending on one side of the roof opening,
 at least one adjustable closure element supported by said stationary part, which is adjustable between a closed position, in which is closes the roof opening, and two different inclined opened positions, in which it releases the roof opening, and
 an operating mechanism disposed between the closure element and the guide rail, and including a supporting member, which supports said closure element, a slide which is capable of sliding movement along said guide rail, and guide means having first and second guide members for positioning the closure element to the two different inclined opened positions, wherein a first position of inclination of the closure element is obtained when the first guide member is in engagement with a first end of the guideway and the second guide member is not in engagement with the guideway, a second position of inclination of the closure element is obtained when the second guide member is in engagement with a second end of the guideway and the first guide member is not in engagement with the guideway.

10. The open roof construction according to claim 9, wherein the slide can be moved both forwards and rearwards from a position corresponding to the closed position of the closure element, and wherein the first position of inclination of the closure element corresponds to movement of the slide in a first direction from the position corresponding to the closed position of the closure element, and wherein the second position of inclination of the closure element corresponds to movement of the slide in a second direction from the position corresponding to the closed position of the closure element.

11. The open roof construction according to claim 10 wherein the guide members are spaced-apart.

12. The open roof construction according to claim 11 wherein each of the spaced-apart guide members engage the guideway in the position of the slide corresponding to the closed position of the closure element.

13. The open roof construction according to claim 12, wherein the guideway is formed on the supporting member and wherein the guide members are formed on the slide.

14. A method for operating at open roof construction, the open roof construction comprising at least one guide rail extending on one side of a roof opening, at least one adjustable closure element supported by guide rail, which is adjustable between a closed position, in which it closes the roof opening, and open positions, in which it releases the roof opening, and an operating mechanism disposed between the closure element and the guide rail, and including a supporting member, which supports said closure element, a slide which is capable of sliding movement along said guide rail, and a first guide member and a second guide member that engage a guideway, the method comprising:
 displacing the slide such that the first guide member engages the guideway to guide the closure element to a first position, wherein during at least a portion of said displacement of the slide with the first guide member engaging the guideway, the second guide member is free from the guideway; and
 displacing the slide such that the second guide member engages the guideway to guide the closure element to a second position, wherein during at least a portion of said displacement of the slide with the second guide member engaging the guideway, the first guide member is free from the guideway.

15. The method of claim 14 wherein the first position of the closure element has a greater angle of inclination to the guide rail than the second position of the panel, and wherein the second position positions the closure element over a portion of the fixed roof.

16. The method of claim 15 wherein displacing the slide such that first guide member engages the guideway is in an opposite direction on the guide rail to displacing the slide such that the second guide member engages the guideway.

17. The method of claim 16 wherein a position of the slide on the guide rail corresponding to a closed position of the closure element is disposed between a position of the slide on the guide rail corresponding to the first position of the closure element and a position of the slide on the guide rail corresponding to the second position of the closure element.

18. The method of claim 17 wherein each of the guide members engage the guideway in the position of the slide corresponding to the closed position of the closure element.

* * * * *